G. W. Umbaugh,
Bee Hive.
No. 88,235. Patented Mar. 23, 1869.
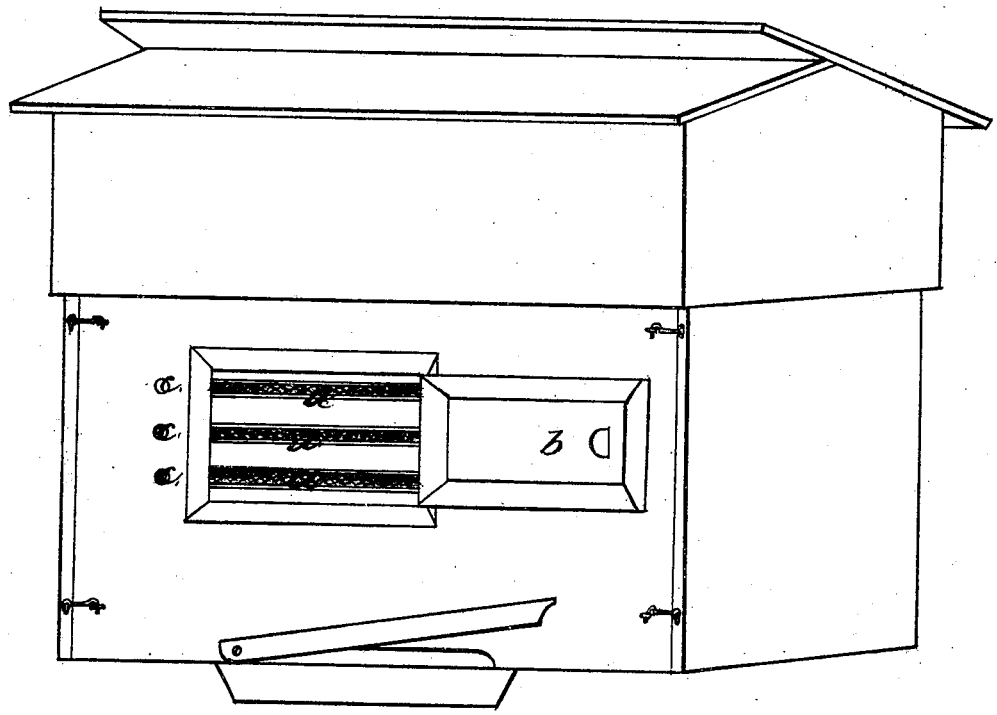
Witnesses:
G. W. James,
Jacob Rudy
Inventor.
G. W. Umbaugh.

GEORGE W. UMBAUGH, OF LIMA, OHIO.

*Letters Patent No. 88,235, dated March 23, 1869.*

IMPROVEMENT IN BEE-HIVE.

The Schedule referred to in these Letters Patent and making part of the same.

*To all whom it may concern:*

Be it known that I, GEORGE W. UMBAUGH, of Lima, in the county of Allen, in the State of Ohio, have invented a new and improved Mode of Feeding Bees; and I do hereby declare that the following is a full and exact description thereof, reference being had to the accompanying drawings, and to the letters of reference marked thereon.

The nature of my invention consists in the arrangement of feeding-troughs substantially fixed within the hive, on the sides thereof.

To enable others to make and use my invention, I will proceed to describe its construction and operation.

I construct my troughs with a groove, and close the end thereof with putty, or any other solid substance, to prevent the feed from running out. I tack the troughs $a\ a\ a$ within the hive, on the sides thereof, as shown by the removed slide $b$, in the accompanying drawing.

For convenience, I drill holes $c\ c\ c$ through which to pass the feed, and this opening I close with movable plugs.

What I claim as my invention, and desire to secure by Letters Patent, is—

The arrangement within a bee-hive, on the side thereof, of feeding-troughs, substantially as herein shown and described, and for the purpose set forth.

GEO. W. UMBAUGH.

Witnesses:
GEO. W. JAMES,
JACOB RUDY.